(12) United States Patent
Morishima

(10) Patent No.: US 11,822,134 B2
(45) Date of Patent: Nov. 21, 2023

(54) OPTICAL-FIBER HOLDING COMPONENT, OPTICAL CONNECTOR, AND OPTICAL COUPLING STRUCTURE

(71) Applicant: SUMITOMO ELECTRIC INDUSTRIES, LTD., Osaka (JP)

(72) Inventor: Tetsu Morishima, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 82 days.

(21) Appl. No.: 17/321,634

(22) Filed: May 17, 2021

(65) Prior Publication Data

US 2021/0271034 A1  Sep. 2, 2021

Related U.S. Application Data

(60) Division of application No. 16/509,838, filed on Jul. 12, 2019, now abandoned, which is a continuation of application No. PCT/JP2018/000451, filed on Jan. 11, 2018.

(30) Foreign Application Priority Data

Jan. 17, 2017 (JP) .............................. JP2017-005989

(51) Int. Cl.
*G02B 6/38* (2006.01)
*G02B 6/40* (2006.01)

(52) U.S. Cl.
CPC ............. *G02B 6/40* (2013.01); *G02B 6/3839* (2013.01)

(58) Field of Classification Search
CPC ..................................... G02B 6/38; G02B 6/40

USPC .......................................................... 385/59
See application file for complete search history.

(56) References Cited

U.S. PATENT DOCUMENTS

| | | | | |
|---|---|---|---|---|
| 5,548,677 A | * | 8/1996 | Kakii | G02B 6/3885 385/83 |
| 5,602,951 A | * | 2/1997 | Shiota | G02B 6/3839 385/71 |
| 5,625,730 A | * | 4/1997 | Ishikawa | G02B 6/3885 385/98 |
| 5,815,621 A | * | 9/1998 | Sakai | G02B 6/3834 264/1.24 |

(Continued)

FOREIGN PATENT DOCUMENTS

| | | |
|---|---|---|
| JP | 2004-004718 A | 1/2004 |
| WO | WO 2013/086127 A2 | 6/2013 |
| WO | WO 2016/031678 A1 | 3/2016 |

*Primary Examiner* — Kaveh C Kianni
(74) *Attorney, Agent, or Firm* — Faegre Drinker Biddle & Reath LLP

(57) ABSTRACT

An optical-fiber holding component disposed in a ferrule holding a plurality of optical fibers, which respectively have at least one core in a region shifted from a region on a center axis and are arranged in a first direction intersecting with the center axis line, is disclosed. The optical-fiber holding component comprises a holding part defining a position of each of coating removed portions in a plane perpendicular to the center axis and holding the coating removed portions, each of the coating removed portions being obtained by removing a resin coating by a predetermined length from a tip end of each of the optical fibers; and a fixing part arranged side by side with the holding part in a second direction along the center axis, resin coated portions of the optical fibers being fixed to the fixing part.

36 Claims, 11 Drawing Sheets

(56) References Cited

U.S. PATENT DOCUMENTS

| | | | | |
|---|---|---|---|---|
| 6,089,759 | A * | 7/2000 | Kawamura | G02B 6/3855 385/80 |
| 6,095,695 | A * | 8/2000 | Ohtsuka | G02B 6/3825 385/83 |
| 9,138,166 | B2 * | 9/2015 | Wong | A61B 5/065 |
| 9,529,155 | B2 * | 12/2016 | Bhagavatula | G02B 6/32 |
| 9,651,743 | B2 * | 5/2017 | Costello, III | G02B 6/3853 |
| 10,353,155 | B2 * | 7/2019 | Abumi | G02B 6/3885 |
| 10,768,378 | B2 * | 9/2020 | Tong | G02B 6/3861 |
| 2004/0057691 | A1 * | 3/2004 | Doss | G02B 6/3846 385/134 |
| 2008/0285922 | A1 * | 11/2008 | Kachmar | G02B 6/3846 385/80 |
| 2010/0310214 | A1 * | 12/2010 | Miyadera | G02B 6/30 385/91 |
| 2012/0269488 | A1 * | 10/2012 | Danley | G02B 6/3839 29/857 |
| 2014/0185986 | A1 * | 7/2014 | Costello, III | G02B 7/02 385/33 |
| 2014/0185991 | A1 * | 7/2014 | de Jong | G02B 6/32 359/652 |
| 2016/0154189 | A1 * | 6/2016 | Elliott | G02B 6/325 156/60 |
| 2016/0202422 | A1 * | 7/2016 | de Jong | G02B 6/4214 385/33 |
| 2016/0202430 | A1 * | 7/2016 | de Jong | G02B 3/0087 385/74 |
| 2017/0168247 | A1 * | 6/2017 | Watanabe | G02B 6/3839 |
| 2018/0314012 | A1 * | 11/2018 | Gsell | G02B 6/3858 |

* cited by examiner

OPTICAL-FIBER HOLDING COMPONENT, OPTICAL CONNECTOR, AND OPTICAL COUPLING STRUCTURE

TECHNICAL FIELD

The present invention relates to an optical-fiber holding component, an optical connector, and an optical coupling structure. The present application claims the priority based on Japanese patent application No. 2017-005989 filed on Jan. 17, 2017, the contents of which are entirely incorporated herein by reference.

BACKGROUND ART

Patent Literature 1 discloses an example of a multi-core connector. In the multi-core connector, a plurality of multi core fibers (MCFs) are respectively inserted into a plurality of optical fiber-holding members. Each MCF is rotationally aligned to each optical fiber-holding member and fixed to each optical fiber-holding member. The plurality of optical fiber-holding members are housed in a ferrule of the multi-core connector in a lined up state.

CITATION LIST

Patent Literature

Patent Literature 1: International Publication No. WO 2016/031678

SUMMARY OF INVENTION

An optical-fiber holding component according to the present disclosure relates to an optical-fiber holding component configured to be disposed in a ferrule and to hold a plurality of optical fibers. Each of the optical fibers has at least one core in a region shifted from a region on a center axis and the optical fibers are arranged in a first direction intersecting with the center axis. The optical-fiber holding component comprises a holding part configured to define a position of each of coating removed portions in a plane perpendicular to the center axis and to hold the coating removed portions, each of the coating removed portions being obtained by removing a resin coating by a predetermined length from a tip end of each of the optical fibers; and a fixing part arranged side by side with the holding part in a second direction along the center axis, resin coated portions of the optical fibers being fixed to the fixing part.

The optical connector according to the present disclosure comprises at least one or more optical-fiber holding components above; a plurality of optical fibers held by the optical-fiber holding component; and a ferrule housing therein the optical-fiber holding component and at least a part of each of the plurality of optical fibers. The ferrule has a front end surface intersecting with the second direction; an opening provided opposite to the front end surface and collectively accommodating the optical-fiber holding component and the plurality of optical fibers; an introduction hole extending from the opening along the second direction and holding the optical-fiber holding component; and a plurality of holding holes extending from a front end of the introduction hole opposite to the opening to the front end surface and holding the coating removed portions of the plurality of optical fibers, respectively.

An optical coupling structure according to the present disclosure comprises first and second optical connectors each of which is the above optical connector. The front end surface of the first optical connector and the front end surface of the second optical connector face each other at a distance in the second direction.

DESCRIPTION OF EMBODIMENTS

Figure 1:
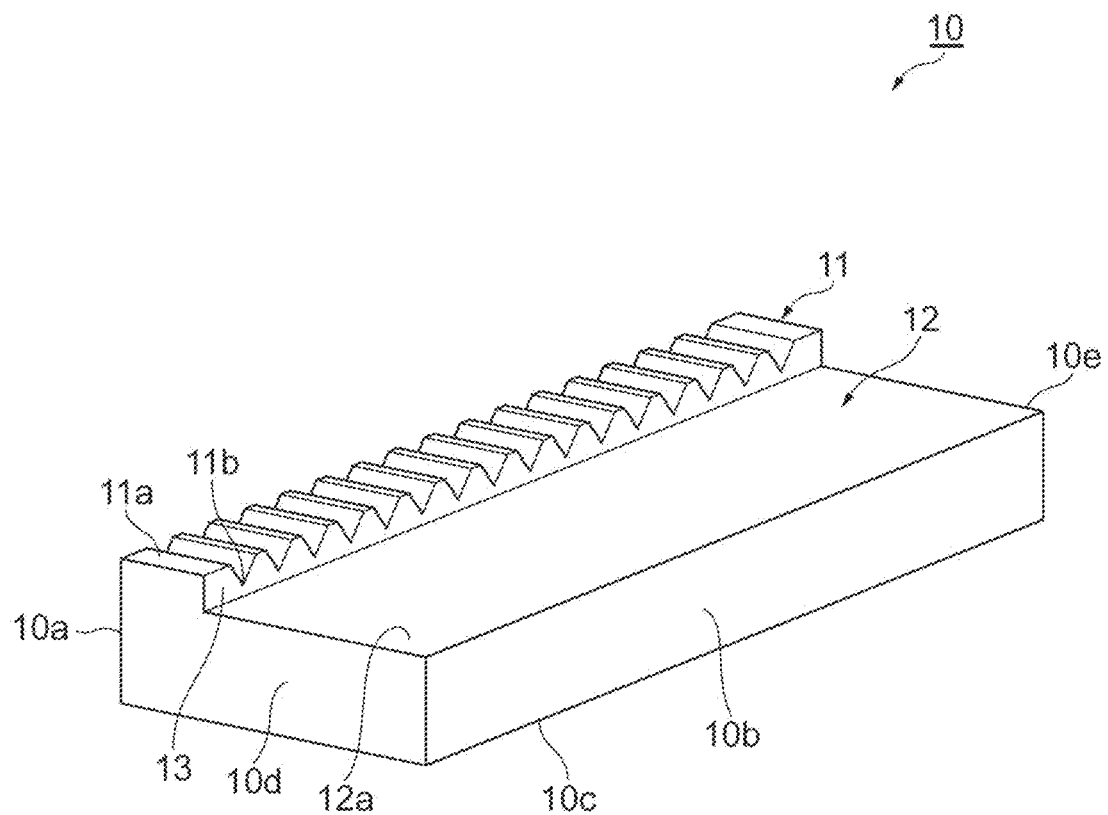
FIG. 1 is a perspective view of an optical-fiber holding component according to an embodiment.
Figure 1:
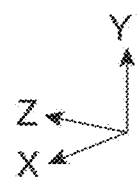

Problem to be Solved by Present Disclosure

For example, a multi-core connector described in Patent Literature 1 has been proposed as a multi-core connector for collectively connecting a plurality of optical fibers (e.g., a plurality of MCFs) each having at least one core in a region shifted from a center axis. In the multi-core connector, the plurality of optical fibers are not directly fixed to a ferrule, but inserted into and fixed to a plurality of optical fiber-holding members, respectively, and then, fixed to the ferrule.

However, in fixing the optical fibers to the optical fiber-holding members as just described, if only portions of the optical fibers removing resin coatings (coating removed portions) are held by the optical fiber-holding members, a problem as described below may occur. When a bending is caused at a portion of the optical fiber positioned behind the optical fiber-holding member, there is a concern that a bending stress concentrates on the coating removed portion at a boundary between a portion held and a portion not held by the optical fiber-holding member. In this case, the coating removed portion may break.

Advantageous Effects of Present Disclosure

According to an optical-fiber holding component, an optical connector, and an optical coupling structure of the present disclosure, breakage of each optical fiber can be reduced when fixing a plurality of optical fibers each having at least one core in a region shifted from a region on a center axis.

DESCRIPTION OF EMBODIMENT IN PRESENT APPLICATION

First, contents of an embodiment in the present application are listed up and described. An optical-fiber holding component according to an embodiment of the present application is an optical-fiber holding component configured to be disposed in a ferrule and to hold a plurality of optical fibers. Each of the optical fibers has at least one core in a region shifted from a region on a center axis and the optical fibers are arranged in a first direction intersecting with the center axis. The optical-fiber holding component comprises a holding part configured to define a position of each of coating removed portions in a plane perpendicular to the center axis and to hold the coating removed portions, each of the coating removed portions being obtained by removing a resin coating by a predetermined length from a tip end of each of the optical fibers; and a fixing part arranged side by side with the holding part in a second direction along the center axis. Resin coated portions of the optical fibers are fixed to the fixing part.

In the optical-fiber holding component described above, the holding part holds the coating removed portions of the respective optical fibers while defining the positions of the coating removed portions such that relative positions and relative angles after the rotational alignment of the coating removed portions with respect to the ferrule can be accurately maintained. In optical-fiber holding component described above, the fixing part fixes the resin coated portions of the respective optical fibers. Normally, the resin coated portions are more resistant to bending than the coating removed portions. Thus, even if a bending is caused at a portion of the optical fiber positioned behind the optical-fiber holding component so that a bending stress concentrates on the resin coated portion at a boundary between a portion held and a portion not held by the optical-fiber holding component, breakage of the optical fiber can be reduced as compared with a case where a bending stress concentrates on the coating removed portion.

In the optical-fiber holding component described above, the holding part may be formed of quartz glass. According to this configuration, a frictional resistance between each of the coating removed portions of the plurality of optical fibers and the holding part can be reduced, and thus, a torsion of the optical fiber when each of the plurality of optical fibers is rotationally aligned can be reduced and a rotational alignment work can be easily performed. In the optical-fiber holding component described above, the holding part may be formed of metal or resin.

In the optical-fiber holding component described above, the holding part may have a plurality of V-grooves on which the coating removed portions of the plurality of optical fibers are respectively placed. According to this configuration, a position of the coating removed portions of each optical fiber in a plane perpendicular to the second direction can be accurately defined. Each of the plurality of V-grooves may extend along the second direction. The plurality of V-grooves may be sequentially provided in the first direction such that respective extending directions thereof are parallel to each other. The optical-fiber holding component described above may further comprise a lid to be placed on the plurality of V-grooves to cover the plurality of V-grooves.

In the optical-fiber holding component described above, the holding part may have a plurality of first holes into which the coating removed portions of the plurality of optical fibers are respectively inserted. According to this configuration, a position of the coating removed portion of each optical fiber in a plane perpendicular to the second direction can be accurately defined. Each of the plurality of first holes may have an expanding portion in diameter toward an end closer to the fixing part in the second direction. In the optical-fiber holding component described above, the fixing part may have one second hole communicating with the plurality of first holes or a plurality of second holes respectively communicating a plurality of first holes.

In the optical-fiber holding component described above, the V-grooves or the first holes may be configured to rotationally hold the coating removed portions of the optical fibers about the center axis.

In the optical-fiber holding component described above, the fixing part may have a fixing surface provided at a position lower than a height of the holding part.

An optical connector according to an embodiment of the present invention comprises at least one or more any optical-fiber holding components described above; a plurality of optical fibers held by the optical-fiber holding component; and a ferrule housing therein the optical-fiber holding component and at least a part of each of the plurality of optical fibers. The ferrule has a front end surface intersecting with the second direction; an opening provided opposite to the front end surface and collectively accommodating the optical-fiber holding component and the plurality of optical fibers; an introduction hole extending from the opening along the second direction and holding the optical-fiber holding component; and a plurality of holding holes extending from a front end of the introduction hole opposite to the opening to the front end surface, and holding the coating removed portions of the plurality of optical fibers, respectively. In the optical connector described above, the optical-fiber holding component may have first and second outer surfaces extending along the second direction, normal lines of the first and second outer surfaces intersecting with each other, and the introduction hole of the ferrule may have first and second inner surfaces respectively contacting with the first and second outer surfaces. The optical connector includes any of the optical-fiber holding components described above, and thus, breakage of each optical fiber can be reduced as described above. According to this configuration, the optical-fiber holding component and the respective optical fibers can be easily assembled. Thus, the optical connector can be easily manufactured. In addition, the first and second outer surfaces of the optical-fiber holding component are brought into contact with the first and second inner surfaces of the ferrule, respectively, such that a relative position and relative angle between the ferrule and the optical-fiber holding component can be accurately defined, and an angle of each optical fiber after the rotational alignment can be accurately maintained with respect to the ferrule.

In the optical connector described above, the opening may correctively accommodate the two or more optical-fiber holding components, the introduction hole may collectively hold the two or more optical-fiber holding components, and the respective optical-fiber holding components may be stacked in a third direction intersecting with the first and second directions. In the optical connector described above, even though the plurality of holding holes are arranged in a plurality of rows (multi-tiered) along the third direction, the respective optical fibers can be arranged correspondingly to the arrangement of the holding holes by stacking the plurality of optical-fiber holding components in the third direction. Therefore, more optical fibers can be connected.

In the optical connector described above, each of the plurality of optical fibers may have one core arranged on the center axis and a plurality of cores arranged about the center axis at equal intervals.

An optical coupling structure according to an embodiment of the present invention comprises first and second optical connectors each of which is the optical connector described above. The front end surface of the first optical connector and the front end surface of the second optical connector face each other at a distance in the second direction. In this optical coupling structure, the first optical connector and the second optical connector are not subjected to physical contact (PC) connection, and thus, a suppress strength for subjecting the first optical connector and the second optical connector to PC connection is not necessary. According to this configuration, an extremely large number of optical fibers can be easily connected collectively.

DETAILED DESCRIPTION OF EMBODIMENT IN PRESENT INVENTION

A description is given of specific examples of an optical-fiber holding component, an optical connector, and an optical coupling structure according to an embodiment of the present invention with reference to the drawings. The present invention is not limited to these illustrated examples, and is intended to be presented by Claims and to include meanings equivalent to Claims and all modifications within the scope of the Claims. In the following description, the same elements in the description of the figures are designated by the same reference signs, and the duplicated description is omitted.

FIG. 1 is a perspective view of an optical-fiber holding component 10 according to the embodiment. In FIG. 1, an XYZ orthogonal coordinate system is illustrated for the purpose of easy understanding. The optical-fiber holding component 10 has an appearance of a substantially rectangular parallelepiped with an arrangement direction being an X-direction as illustrated in FIG. 1. In other words, a cross-sectional shape of the optical-fiber holding component 10 parallel to an X-Y plane is a substantially rectangular shape with the arrangement direction being the X-direction. The optical-fiber holding component 10 is formed of quartz glass.

Alternatively, the optical-fiber holding component 10 may be formed of metal materials or resin materials.

As illustrated in FIG. 1, the optical-fiber holding component 10 has a front end surface 10a, a back end surface 10b, a bottom surface 10c, a lateral surface 10d, a lateral surface 10e, a holding part 11, and a fixing part 12. The front end surface 10a and the back end surface 10b face each other in a Z-direction and are parallel to the X-Y plane. The bottom surface 10c intersects with a Y-direction and is parallel to an X-Z plane. The lateral surface 10d and the lateral surface 10e face each other in the X-direction and are parallel to a Y-Z plane. Normal lines of the lateral surfaces 10d and 10e intersect with (or, in the embodiment, are perpendicular to) a normal line of the bottom surface 10c.

The holding part 11 is provided closer to the front end surface 10a in the Z-direction. The holding part 11 has a top surface 11a and a plurality of V-grooves 11b. The top surface 11a is provided opposite to the bottom surface 10c and parallel to the X-Z plane. The plurality of V-grooves 11b are formed on the top surface 11a. The plurality of V-grooves 11b respectively extend from the front end surface 10a toward the back end surface 10b in the Z-direction, and align along the X-direction. In other words, the plurality of V-grooves 11b are respectively provided sequentially in the X-direction such that extending directions thereof (i.e., the Z-direction) are parallel to each other. In one example, sixteen (16) V-grooves 11b align at equal intervals along the X-direction. Each of the plurality of V-grooves 11b holds each of coating removed portions 22 of a plurality of MCFs 20 described later (see FIG. 2 and FIG. 4). Specifically, each of the coating removed portions 22 of the plurality of MCFs 20 is placed on and housed in each of the plurality of V-grooves 11b. In a state before the plurality of MCFs 20 are adhered and fixed to the optical-fiber holding component 10, each of the plurality of V-grooves 11b holds each of the coating removed portions 22 of the plurality of MCFs 20 rotatably about respective center axes. Each of the plurality of V-grooves 11b defines a position of each of the coating removed portions 22 in a plane perpendicular to the center axes (i.e., in the X-Y plane).

The fixing part 12 is provided closer to the back end surface 10b in the Z-direction and is arranged side by side with the holding part 11 in a direction along the center axis of the MCF 20 (i.e., in the Z-direction). The fixing part 12 extends from an end of the holding part 11 closer to the back end surface 10b to the back end surface 10b in the Z-direction. Each of coated portions 23 of the plurality of MCFs described later is fixed to the fixing part 12 (see FIG. 2 and FIG. 4). The fixing part 12 has a top surface 12a that intersects with the Z-direction and is parallel to the X-Z plane. The coated portions 23 are fixed to the top surface 12a. The top surface 12a is provided opposite to the bottom surface 10c. The top surface 12a is arranged at a position lower than a height of the holding part 11. The top surface 12a forms a step with respect to the top surface 11a. In other others, the top surface 12a is arranged closer to the bottom surface 10c with respect to the top surface 11a in the Y-direction. According to this configuration, when the coated portion 23 larger in an outer diameter than the coating removed portion 22 is placed on the top surface 12a, bending caused to the optical fiber is reduced. The top surface 12a is coupled to the top surface 11a through a surface 13. The surface 13 is parallel to the X-Y plane.

Figure 2:
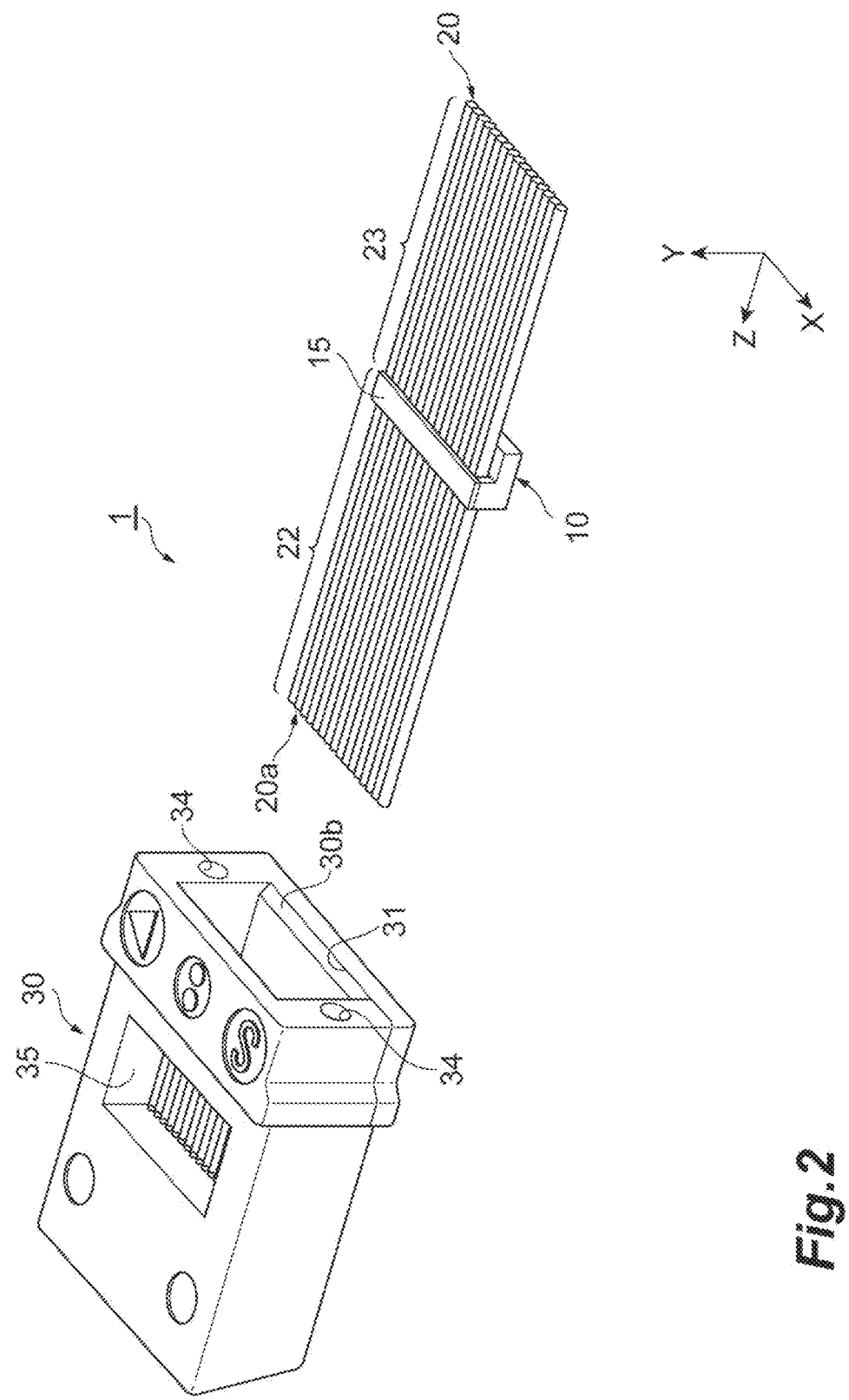
FIG. 2 is an exploded perspective view illustrating a configuration of an optical connector including the optical-fiber holding component according to an embodiment.
Figure 3:
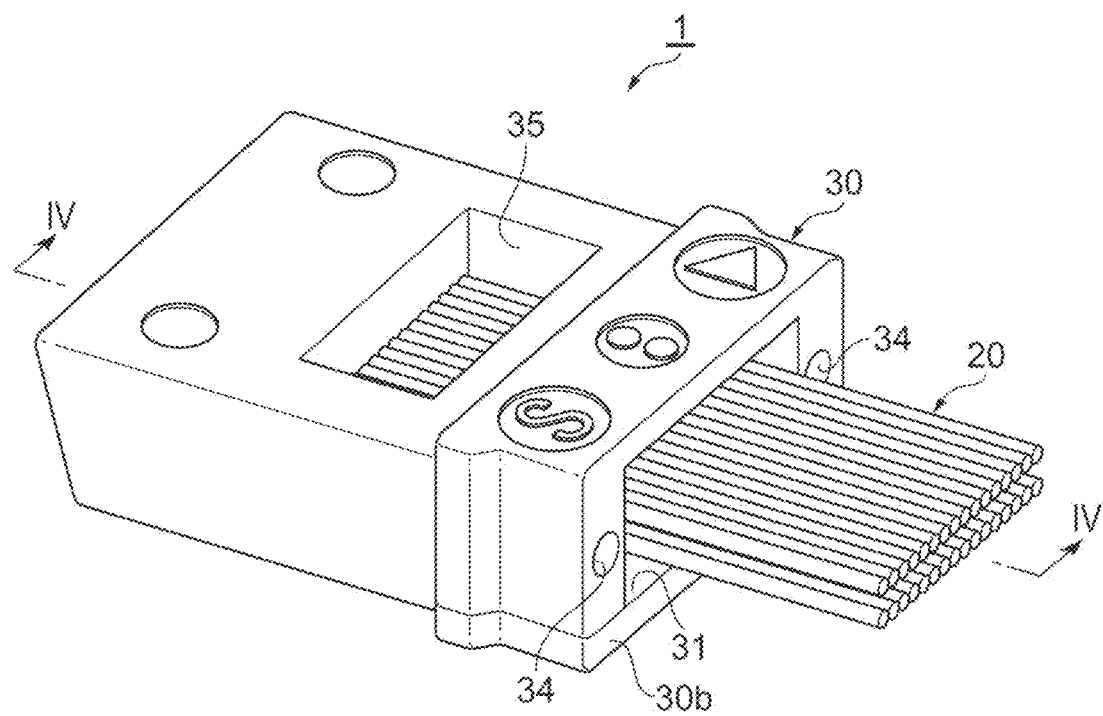
FIG. 3 is a perspective view of an optical connector according to an embodiment.
Figure 4:
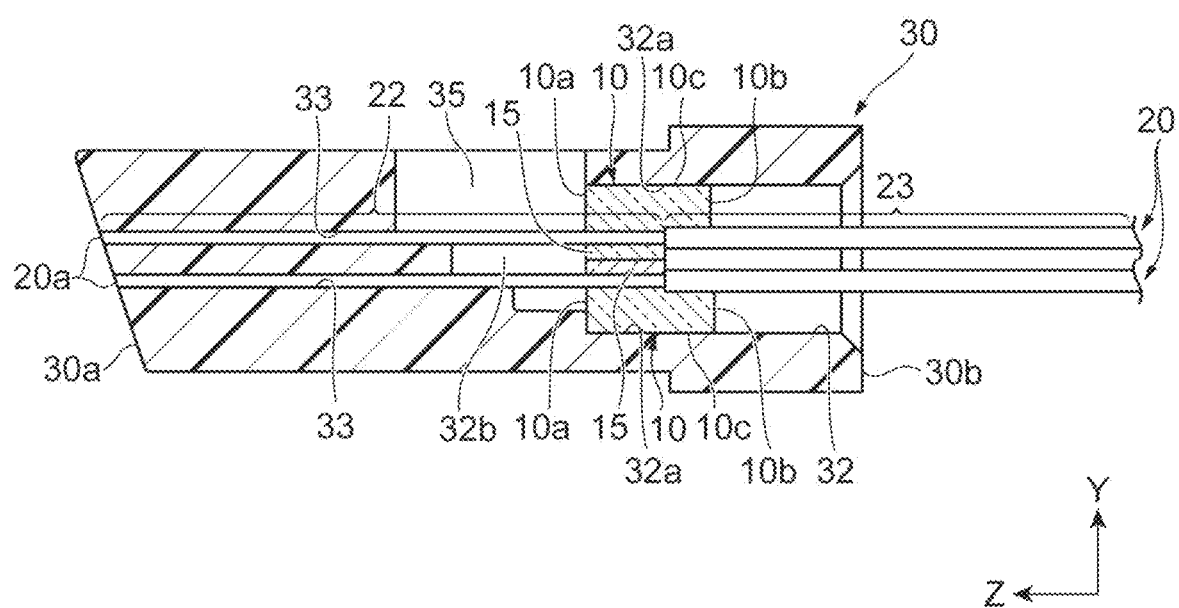
FIG. 4 is a cross-sectional view taken along a line IV-IV illustrated in FIG. 3.

FIG. 2 is an exploded perspective view illustrating a configuration of an optical connector 1 including the optical-fiber holding component 10 according to the embodiment. FIG. 3 is a perspective view of the optical connector 1 according to the embodiment after assembling. FIG. 4 is a cross-sectional view taken along a line IV-IV illustrated in FIG. 3. For the purpose of easy understanding, FIG. 2 illustrates only one optical-fiber holding component 10, and FIG. 3 illustrates a plurality of optical-fiber holding components 10 (two in the embodiment). An XYZ coordinate system illustrated in each figure corresponds to the XYZ orthogonal coordinate system illustrated in FIG. 1. As illustrated in FIG. 3 and FIG. 4, the optical connector 1 includes the plurality of optical-fiber holding components 10, the plurality of MCFs 20, and a ferrule 30. The optical-fiber holding components 10 each hold the plurality of MCFs 20, and are stacked in the Y-direction. In one example, two optical-fiber holding components 10 each hold sixteen (16) MCFs 20 arranged along the X-direction and are stacked in two tiers along the Y-direction. In stacking these two optical-fiber holding components in two tiers along the Y-direction, a plate-like lid 15 is provided on the top surface 11a of each of the optical-fiber holding components 10 as illustrated in FIG. 2. Specifically, the lid 15 is disposed on the plurality of V-grooves 11b to cover the plurality of V-grooves 11b. Then, the optical-fiber holding components 10 are fixed to each other in a state where one optical-fiber holding component 10 of two optical-fiber holding components 10 is inverted in the Z-direction such that these lids 15 face each other.

Each MCF 20 has a tip end surface 20a, the coating removed portion 22, and the coated portion 23 as illustrated in FIG. 2 and FIG. 4. The tip end surface 20a is provided opposite to the fixing part 12 with the holding part 11 being interposed therebetween. In other words, the front end surface 10a is provided closer to the tip end surface 20a in the Z-direction. Each MCF 20 has at least one core in a region except for a region on the center axis (i.e., a region shifted from a region on the center axis). In an example, each MCF 20 has one core (center core) on the center axis, and further has a plurality of (e.g., six) cores (peripheral cores) arranged about the center axis at equal intervals. The MCF 20 further has a cladding surrounding to coat these cores.

The coated portion 23 has the plurality of cores, the cladding, and a resin coating to coat the plurality of cores and the cladding. Specifically, the resin coating coats around the cladding surrounding the plurality of cores. The coated portion 23 is fixed through adhering to the top surface 12a of the fixing part 12 of each optical-fiber holding component 10 as described above. The coating removed portion 22 is a portion of the MCF 20 from which the resin coating is removed by a predetermined length from the tip end surface 20a to expose the cladding. The coating removed portion 22 extends from an end of the coated portion 23 closer to the tip end surface 20a to the tip end surface 20a in the Z-direction. The coating removed portion 22 is held by the V-groove 11b of each optical-fiber holding component 10 as described above.

The ferrule 30 houses therein the plurality of optical-fiber holding components 10 and at least a part of each of the plurality of MCFs 20. The ferrule 30 has a front end surface 30a, a back end surface 30b, an opening 31, an introduction hole 32, a plurality of holding holes 33, a pair of guide holes 34, and a window 35. The front end surface 30a intersects with the Z-direction, and is inclined to a plane perpendicular to the Z-direction. In one example, the front end surface 30a is flush with the tip end surfaces 20a of the MCFs 20. The opening 31 is provided on the back end surface 30b opposite to the front end surface 30a in the Z-direction. The opening 31 collectively accommodates the respective optical-fiber holding components 10 and the respective MCFs 20. The opening 31 has a substantially rectangular shape of which a longitudinal direction is the X-direction in one example.

The introduction hole 32 extends from the opening 31 along the Z-direction. A cross section of the introduction hole 32 in parallel to the X-Y plane is a substantially rectangular shape of which a longitudinal direction is the X-direction in one example. The introduction hole 32 collectively holds the optical-fiber holding components 10. The introduction hole 32 has a pair of inner wall surfaces 32a facing each other and a pair of inner wall surfaces 32b facing each other. FIG. 4 illustrates one of the pair of inner wall surfaces 32b. The inner wall surfaces 32a intersect with the Y-direction and are arranged at positions facing the bottom surface 10c of the optical-fiber holding component 10. The inner wall surfaces 32b are coupled to the inner wall surfaces 32a and intersect with the X-direction. The inner wall surfaces 32b are arranged at positions facing the lateral surfaces 10d and 10e of the optical-fiber holding component 10 (see FIG. 1). The inner wall surfaces 32a and 32b are brought into contact with the bottom surface 10c and the lateral surfaces 10d and 10e, such that the respective optical-fiber holding components are positioned with respect to the introduction hole 32. Specifically, the inner wall surfaces 32a contact with the bottom surfaces 10c in the Y-direction, respectively, such that positions of the optical-fiber holding components 10 with respect to the introduction hole 32 in the Y-direction are defined. Specifically, the inner wall surfaces 32a contact with the lateral surfaces 10c in the Y-direction, respectively, such that positions of the optical-fiber holding components 10 with respect to the introduction hole 32 in the Y-direction are defined. The inner wall surfaces 32b contact with the lateral surfaces 10d and 10e in the X-direction, respectively, such that positions of the optical-fiber holding components 10 with respect to the introduction hole 32 in the X-direction are defined.

The plurality of holding holes 33 extend from a front end of the introduction hole 32 opposite to the opening 31 to the front end surface 30a as illustrated in FIG. 4. The plurality of holding holes 33 are arranged one-dimensionally or two-dimensionally on the front end surface 30a. In one example, two rows of the holding holes are arranged along the Y-direction, each row having sixteen (16) holding holes arranging along the X-direction. Each holding hole 33 holds the coating removed portion 22 of each MCF 20. Specifically, each holding hole 33 holds a portion of the coating removed portion 22 of each MCF 20 including the tip end surface 20a.

The pair of guide holes 34 extend from the front end surface 30a along the Z-direction until the back end surface 30b, and are provided on both sides with the plurality of holding holes 33 interposed therebetween in the X-direction. A cross section of each of the pair of guide holes 34 perpendicular to a center axis thereof is circular.

In manufacturing the optical connector 1, each of the coating removed portions 22 of the plurality of MCFs 20 is placed on each of the plurality of V-grooves 11b of the optical-fiber holding component 10, and each MCF 20 is rotationally aligned about the center axis. At this time, the respective MCFs 20 are rotationally aligned one by one with respect to the optical-fiber holding component 10. After that, the optical-fiber holding component 10 and the MCFs 20 are fixed to each other via an adhesive, and the plurality of optical-fiber holding components 10 are stacked in the Y-direction via the lid 15. Examples of the adhesive include an UV curable adhesive or a thermosetting adhesive. Then, in a state where the respective optical-fiber holding components 10 are fixed to each other, each optical-fiber holding component 10 is inserted into the introduction hole 32 of the ferrule 30. At this time, each optical-fiber holding component 10 is positioned at a position where the bottom surface 10c of each optical-fiber holding component 10 is in contact with the pair of inner wall surfaces 32a, respectively, and the lateral surfaces 10d and 10e are in contact with the pair of inner wall surfaces 32b, respectively. After that, the ferrule 30, the plurality of optical-fiber holding components 10, and the plurality of MCFs 20 are fixed to each other via the adhesive. For example, by introducing a thermosetting adhesive from the window 35 provided on an upper side of the ferrule 30 for thermally curing, the holding hole 33 and the coating removed portions 22 can be also fixed to each other.

Figure 5:
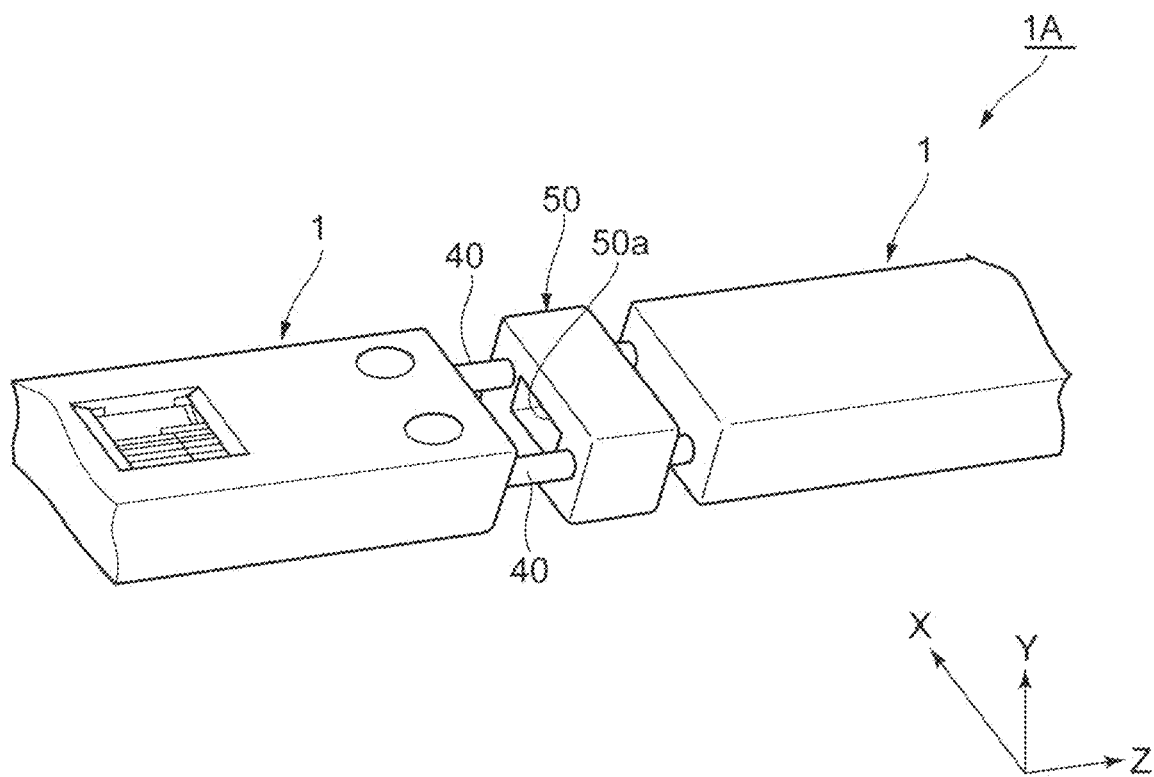
FIG. 5 is a perspective view illustrating a configuration of an optical coupling structure including the optical connector according to an embodiment.

FIG. 5 is a perspective view illustrating a configuration of an optical coupling structure 1A including the optical connectors 1 according to the embodiment. An XYZ coordinate system illustrated in FIG. corresponds to the XYZ orthogonal coordinate systems illustrated in FIG. 1 to FIG. 4. As illustrated in FIG. 5, the optical coupling structure 1A includes a pair of optical connectors 1, a pair of guide pins 40, and a spacer 50. One optical connector 1 and the other optical connector 1 of the pair of optical connectors 1 face each other at a distance. The pair of guide pins 40 extend along the Z-direction and each cross section perpendicular to a center axis thereof is circular. Outer diameter of the guide pin 40 matches inner diameter of the guide hole 34. One ends of the pair of guide pins 40 in the Z-direction are respectively inserted into the pair of guide holes 34 of one optical connector 1, and the other ends of the pair of guide pins 40 are respectively inserted into the pair of guide holes 34 of the other optical connector 1. One optical connector 1 and the other optical connector 1 are aligned in the X-Y plane by the pair of guide pins 40. The spacer 50 has a plate-like shape having an opening 50a. The opening 50a passes a plurality of light paths extending between one optical connector 1 and the other optical connector 1. The spacer 50 contacts with one optical connector 1 and the other optical connector 1 such that a distance between one optical connector 1 and the other optical connector 1 is defined.

A description is given of effects obtained by the optical-fiber holding component 10, the optical connector 1, and the optical coupling structure 1A according to the embodiment described above. In the optical-fiber holding component 10 according to the embodiment, the holding part 11 holds the coating removed portions 22 of the respective MCFs 20 while defining the positions of the coating removed portions 22 such that relative positions and relative angles after the rotational alignment of the coating removed portions 22 with respect to the ferrule can be accurately maintained. In optical-fiber holding component according to the embodiment, the fixing part 12 fixes the coated portion 23 of each MCF 20. Normally, the coated portion 23 is more resistant to bending than the coating removed portion 22. Thus, even if a bending is caused at a portion of the MCF 20 positioned behind the optical-fiber holding component 10 so that a bending stress concentrates on the coated portion 23 at a boundary between a portion held and a portion not held by the optical-fiber holding component 10, breakage of the MCF 20 can be reduced as compared with a case where a bending stress concentrates on the coating removed portion 22.

The holding part 11 may be formed of quartz glass. According to this configuration, a frictional resistance between the coating removed portions 22 of the plurality of MCFs 20 and the respective V-grooves 11b can be reduced, and thus, a torsion of the MCF 20 when each of the plurality of MCFs 20 is rotationally aligned can be reduced and a rotational alignment work can be easily performed. A portion including the plurality of V-grooves 11b of the holding part 11 may be formed of quartz glass.

The holding part 11 may have the plurality of V-grooves 11b, each of the coating removed portions 22 of the plurality of MCFs 20 being placed on each of the plurality of V-grooves 11b. According to this configuration, the position of the coating removed portion 22 of each MCF 20 in the X-Y plane can be accurately defined.

The optical connector 1 according to the embodiment includes the optical-fiber holding component 10 according to the embodiment, and thus, breakage of each MCF 20 can be reduced as described above. According to this, the optical-fiber holding component 10 and the respective MCFs 20 can be easily assembled. Thus, the optical connector 1 according to the embodiment can be easily manufactured. In addition, the bottom surfaces 10c and the lateral surfaces 10d and 10e of the optical-fiber holding component 10 are brought into contact with the inner wall surfaces 32a and 32b of the ferrule 30, such that a relative position and relative angle between the ferrule 30 and the optical-fiber holding component 10 can be accurately defined, and an angle of each MCF 20 after the rotational alignment can be accurately maintained with respect to the ferrule 30.

The optical connector 1 may comprise the plurality of optical-fiber holding components 10. In the optical connector 1 according to the embodiment, as illustrated in FIG. 3 and FIG. 4, even though the plurality of holding holes 33 are arranged in a plurality of rows (multi-tiered) along the Y-direction, the respective MCFs 20 can be arranged correspondingly to the arrangement of the holding holes 33 by stacking the plurality of optical-fiber holding components 10 in the Y-direction. Therefore, more MCFs 20 can be connected.

An optical coupling structure 1A according to the embodiment comprises the pair of optical connectors 1, and one optical connector 1 and the other optical connector 1 of the pair of optical connectors 1 face each other at a distance in the Z-direction. As illustrated in FIG. 5, in the optical coupling structure 1A according to the embodiment, one optical connector 1 and the other optical connector 1 are not subjected to PC connection, and thus, a suppress strength for subjecting one optical connector 1 and the other optical connector 1 to PC connection is not necessary. According to this configuration, significantly many MCFs 20 can be easily connected.

First Modification Example

Figure 6:
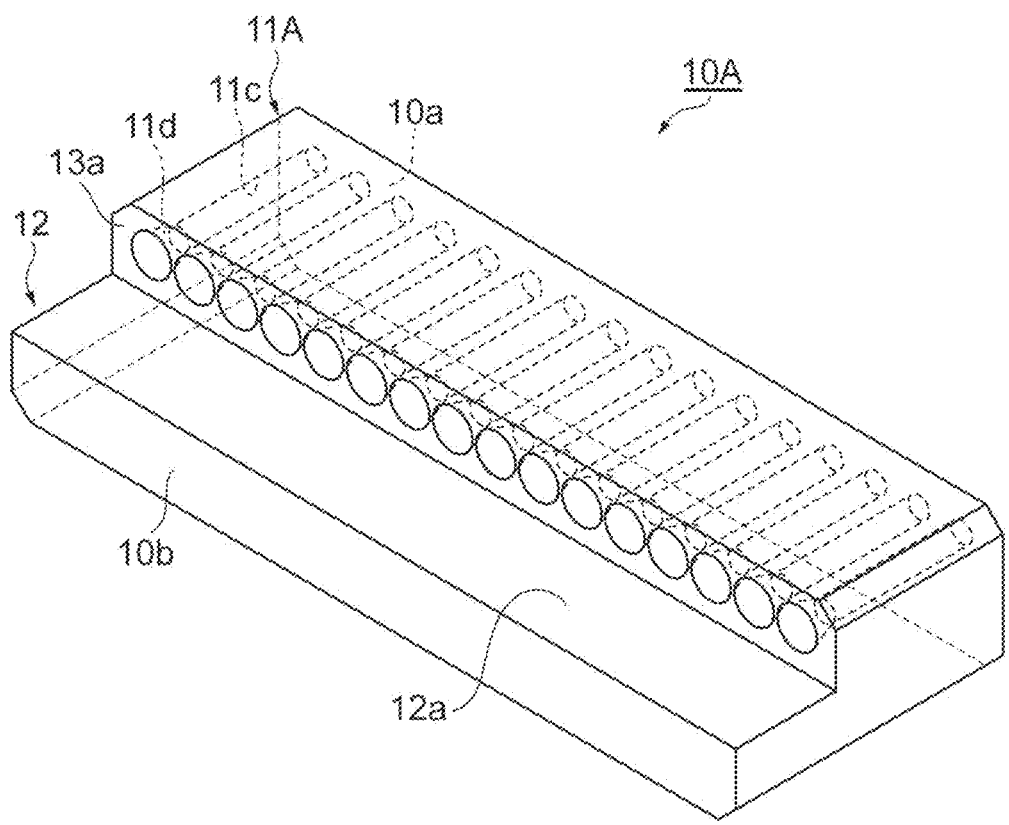
FIG. 6 is a perspective view of an optical-fiber holding component according to a first modification example.
Figure 7:
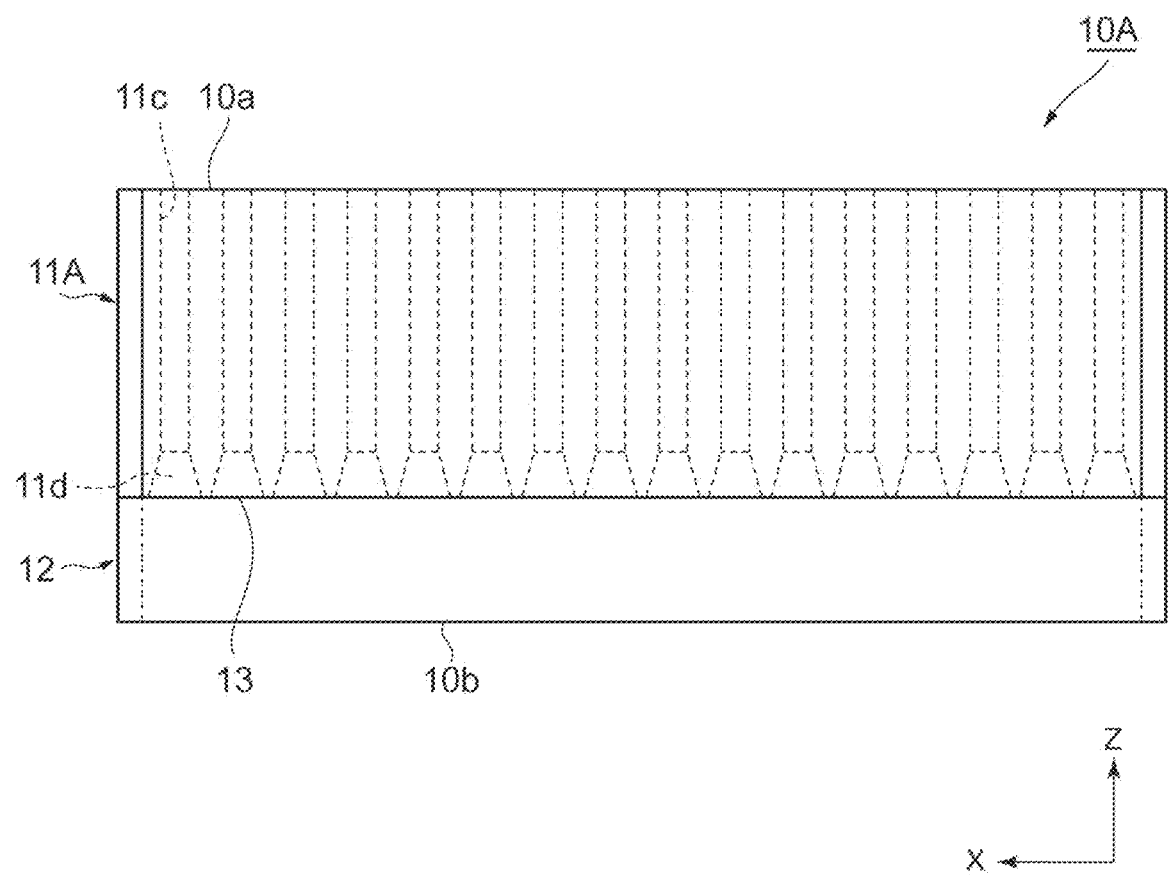
FIG. 7 is a top view of the optical-fiber holding component illustrated in FIG. 6.

FIG. 6 is a perspective view of an optical-fiber holding component 10A according to a first modification example of the above-described embodiment. FIG. 7 is a top view of the optical-fiber holding component 10A illustrated in FIG. 6. A difference between this modification example and the above embodiment is that the holding part 11A includes a plurality of holding holes 11c in place of the plurality of V-grooves 11b. As illustrated in FIG. 6 and FIG. 7, the plurality of holding holes 11c penetrate from the front end surface 10a to the surface 13 along the Z-direction. A cross sectional shape of each of the plurality of holding holes 11c in parallel to the X-Y plane is circular. The plurality of holding holes 11c align along the X-direction. In one example, sixteen (16) holding holes 11c are arranged at equal intervals along the X-direction. An inner diameter of each holding hole 11c is the same as the outer diameter of the coating removed portion 22 of each MCF 20 according to the above embodiment, or is slightly larger than the outer diameter of the coating removed portion 22. Each holding hole 11c rotationally holds the coating removed portion 22 of each MCF 20 about the center axis. A taper 11d is formed at a back end portion of each holding hole 11c closer to the surface 13. In this taper 11d, the closer to the face 13, the larger the inner diameter of each of the plurality of holding holes 11c. In other words, in this taper 11d, the diameter of each holding hole 11c expands toward a back end closer to the fixing part 12 in the Z-direction. Each of the plurality of holding holes 11c holds each of the coating removed portion 22 of the plurality of MCFs 20. Each holding hole 11c defines a position of each coating removed portion 22 in the X-Y plane. By holding each MCF 20 by each holding hole 11c in this manner, the coating removed portion 22 can be held while accurately defining the position of the coating removed portion 22 of each MCF 20 in the X-Y plane. By providing the taper 11d to each holding hole 11c, the coating removed portion 22 of each MCF 20 can be easily inserted into each holding hole 11c.

Second Modification Example

Figure 8:
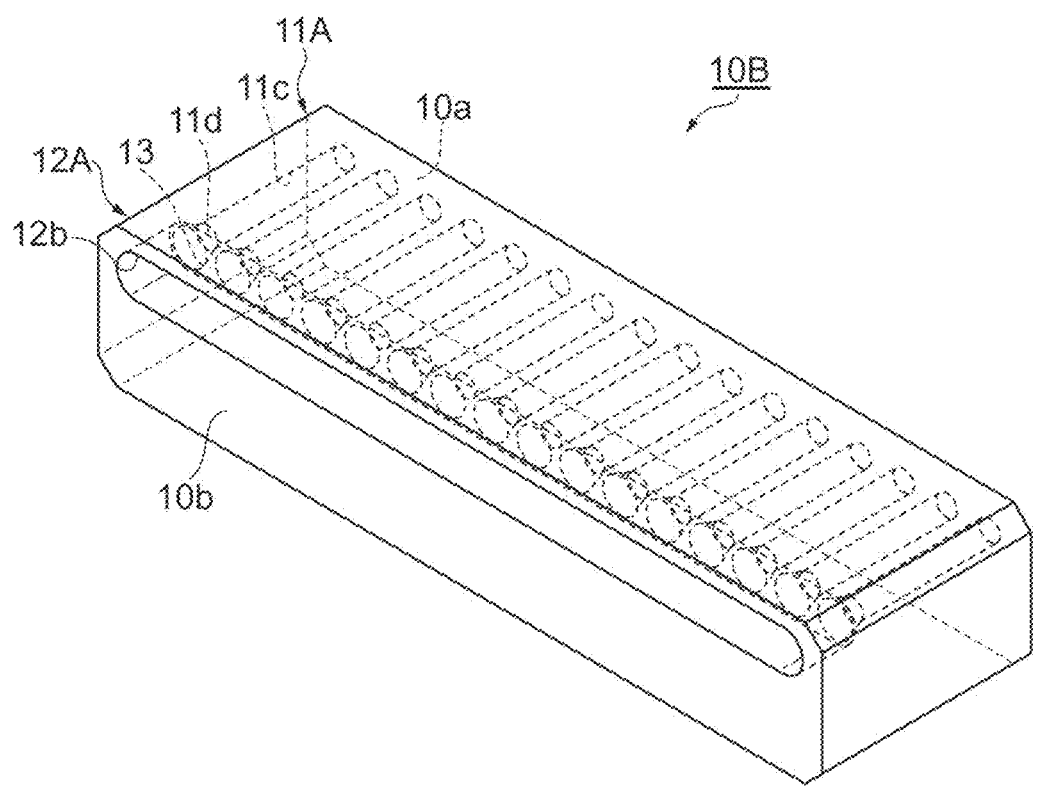
FIG. 8 is a perspective view of an optical-fiber holding component according to a second modification example.
Figure 8:
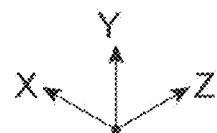
Figure 9:
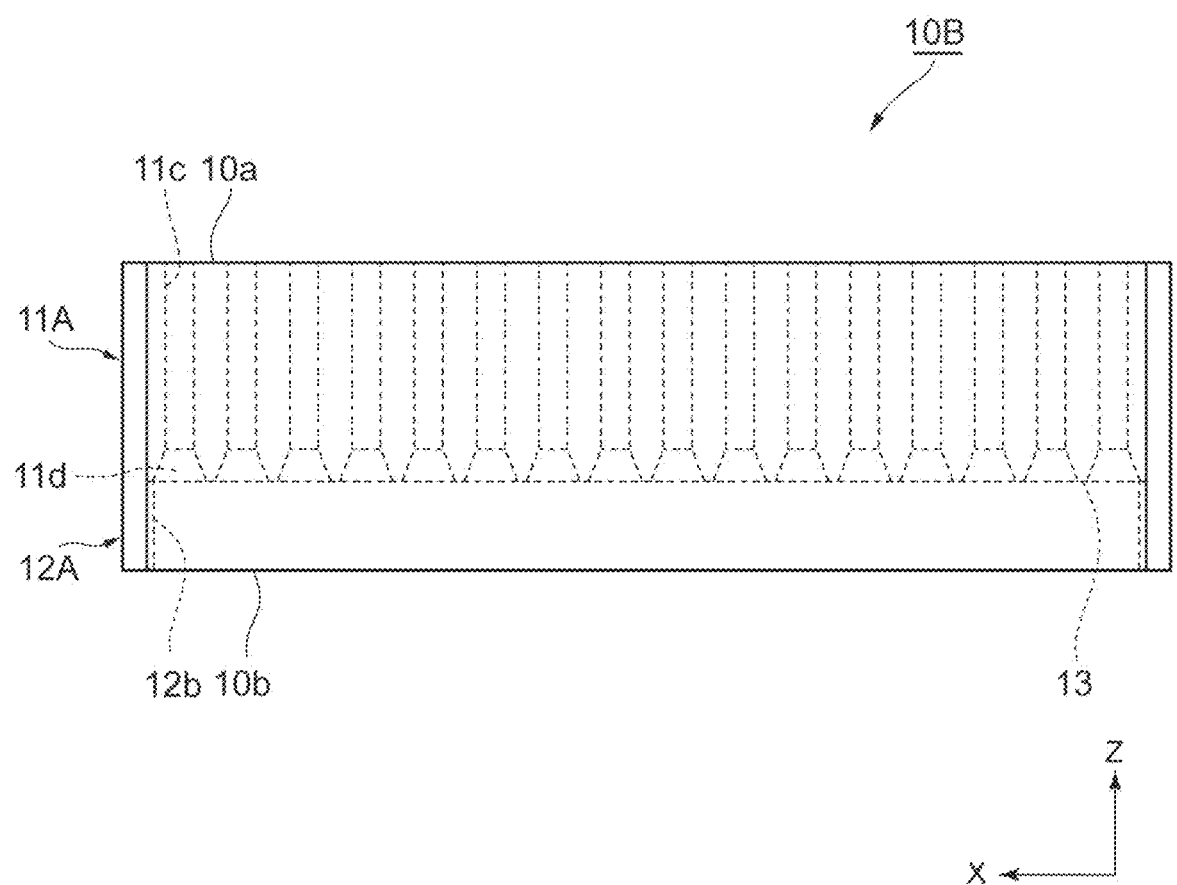
FIG. 9 is a top view of the optical-fiber holding component illustrated in FIG. 8.

FIG. 8 is a perspective view of an optical-fiber holding component 10B according to a second modification example of the above-described embodiment. FIG. 9 is a top view of the optical-fiber holding component 10B illustrated in FIG. 8. A difference between this modification example and the above embodiment is that the holding part 11A includes the plurality of holding holes 11c in place of the plurality of V-grooves 11b, and a fixing part 12A has a fixing hole 12b in place of the top face 12a. A form of the plurality of holding holes 11c is the same as the first modification example described above. The fixing hole 12b is a hole formed on the back end surface 10b with a depth direction thereof being the Z-direction and the surface 13 being a bottom surface thereof. The fixing hole 12b communicates with the plurality of holding holes 11c. A cross sectional shape of the fixing hole 12b in parallel to the X-Y plane is an oval shape of which a longitudinal direction is the X-direction in an embodiment. The coated portions 23 of the plurality of MCFs 20 are collectively inserted into the fixing hole 12b, and fixed via an adhesive. The fixing part may have a shape as in this modification example, in which the coated portion 23 of the respective MCFs 20 can be more reliably fixed.

Third Modification Example

Figure 10:
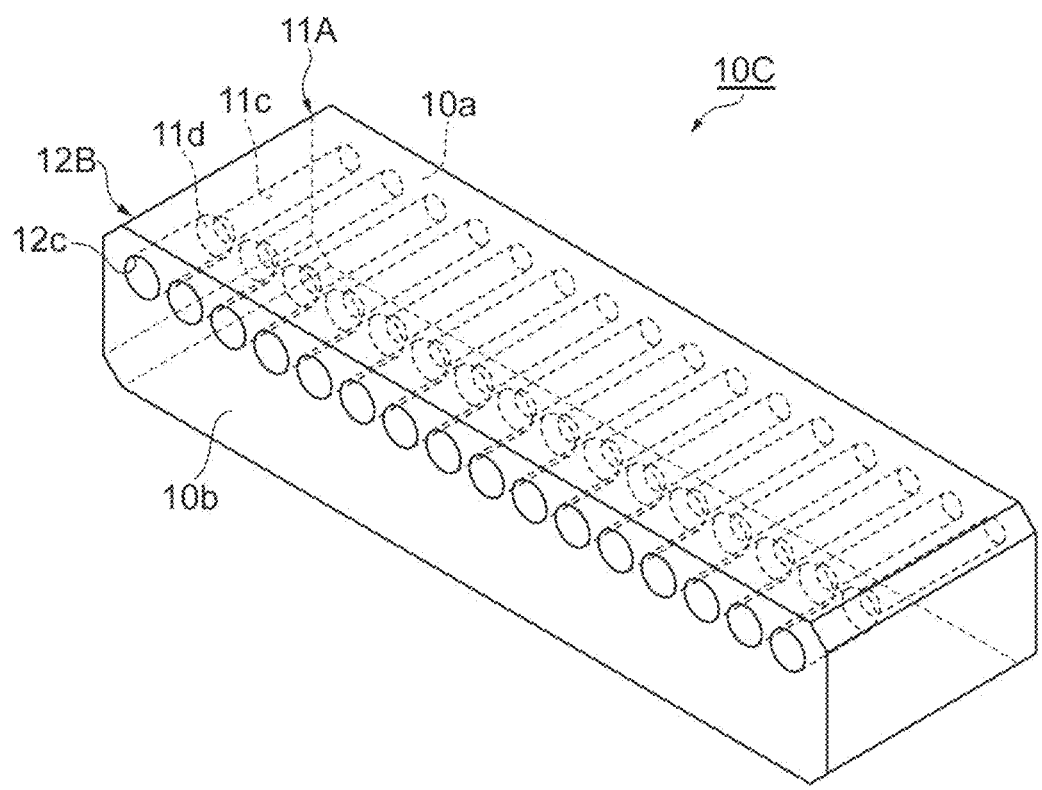
FIG. 10 is a perspective view of an optical-fiber holding component according to a third modification example.
Figure 10:
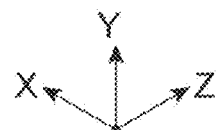
Figure 11:
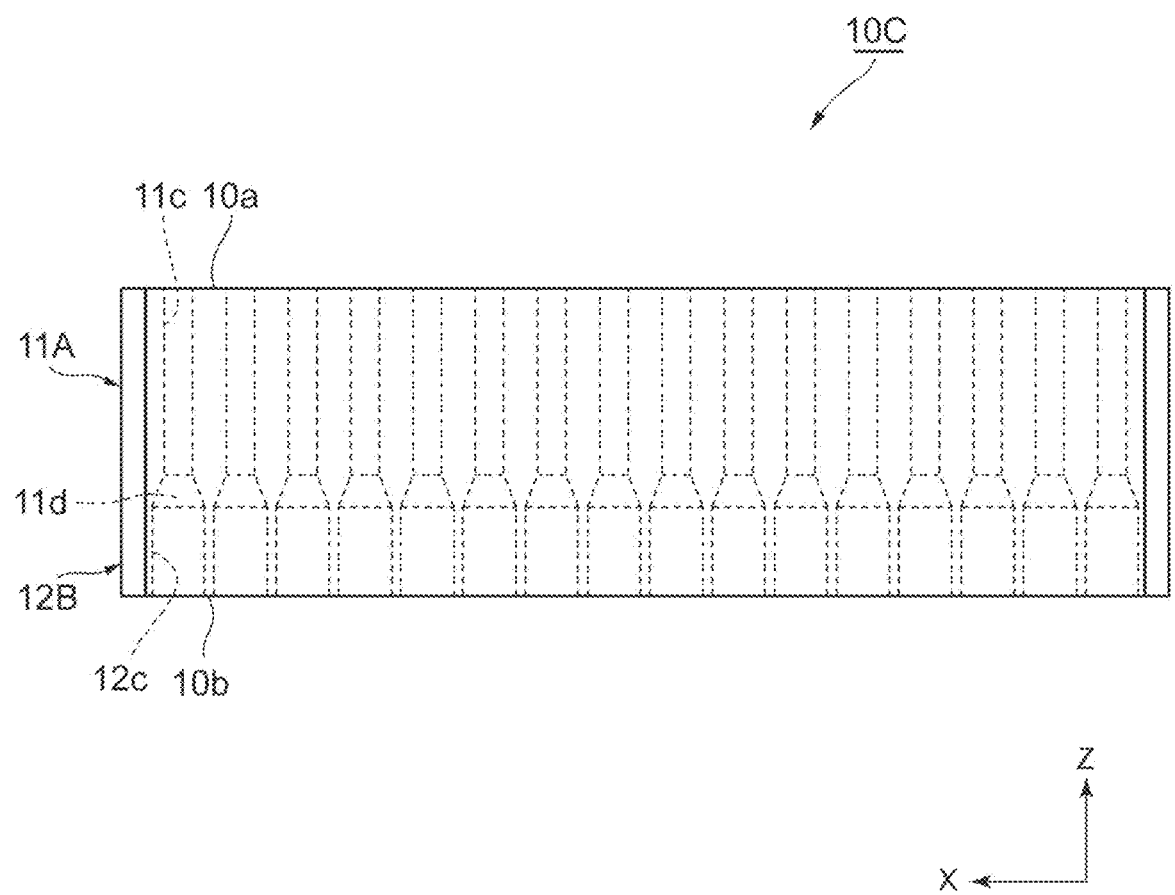
FIG. 11 is a top view of the optical-fiber holding component illustrated in FIG. 10.

FIG. 10 is a perspective view of an optical-fiber holding component 10C according to a third modification example of the above-described embodiment. FIG. 11 is a top view of the optical-fiber holding component 10C illustrated in FIG. 10. A difference between this modification example and the above embodiment is that the holding part 11A includes the plurality of holding holes 11c in place of the plurality of V-grooves 11b, and a fixing part 12B has a plurality of fixing holes 12c in place of the top face 12a. A form of the plurality of holding holes 11c is the same as the first modification example described above. The plurality of fixing holes 12c are each a hole formed on the back end surface 10b with a depth direction thereof being the Z-direction, and communicate with the plurality of holding holes 11c, respectively. A cross sectional shape of each fixing hole 12c in parallel to the X-Y plane is circular. An inner diameter of each fixing hole 12c is the same as the outer diameter of the coated portion 23 of each MCF 20, or is slightly larger than the outer diameter of the coated portion 23. The respective coated portions 23 of the plurality of MCFs 20 is inserted into the respective fixing holes 12c, and fixed to the respective fixing holes 12c via an adhesive. The fixing part may have a shape as in this modification example, in which the coated portion 23 of the respective MCFs 20 can be more reliably fixed.

REFERENCE SIGNS LIST

1 . . . Optical connector, 1A . . . Optical coupling structure, 10, 10A, 10B, 10C . . . Optical-fiber holding component, 10a, 30a . . . Front end surface, 10b, 30b . . . Back end surface, 10c . . . Bottom surface, 10d, 10e . . . Lateral surface, 11, 11A . . . Holding part, 11a, 12a . . . Top surface, 11b . . . V-groove, 11c . . . Holding hole, 11d . . . Taper, 12, 12A, 12B . . . Fixing part, 12b, 12c . . . Fixing hole, 13 . . . Surface, 15 . . . Lid, 20a . . . Tip end surface, 22 . . . Coating removed portion, 23 . . . Coated portion, 30 . . . Ferrule, 31 . . . Opening, 32 . . . Introduction hole, 32a, 32b . . . Inner wall surface, 33 . . . Holding hole, 34 . . . Guide hole, 35 . . . Window, 40 . . . Guide pin, 50 . . . Spacer, 50a . . . Opening.

The invention claimed is:

1. An optical connector comprising:
a plurality of optical fibers each having a center axis, wherein the plurality of optical fibers include resin coated portions and coating removed portions being obtained by removing each resin coating by a predetermined length from a tip end of each of the optical fibers, and each of the optical fibers includes at least one core in a region shifted from a region on the center axis, the optical fibers being arranged in a first direction intersecting with the center axis;
at least one optical-fiber holding component including a holding part defining a position of each of the coating removed portions in a plane perpendicular to the center axis and holding the coating removed portions; and a fixing part arranged side by side with the holding part in a second direction along the center axis and fixing the resin coated portions; and
a ferrule housing the optical-fiber holding component and at least a part of each of the plurality of optical fibers therein,
wherein the ferrule has:
a front end surface intersecting with the second direction;
an opening provided opposite to the front end surface and collectively accommodating the optical-fiber holding component and the plurality of optical fibers;
an introduction hole extending from the opening along the second direction and holding the optical-fiber holding component; and
a plurality of holding holes extending from a front end of the introduction hole opposite to the opening to the front end surface, and holding the coating removed portions of the plurality of optical fibers, respectively, and
wherein the optical-fiber holding component has first and second outer surfaces extending along the second direction, normal lines of the first and second outer surfaces intersect with each other, and the introduction hole of the ferrule has first and second inner surfaces respectively contacting with the first and second outer surfaces.

2. The optical connector according to claim 1, wherein each of the plurality of optical fibers has one core arranged on the center axis and a plurality of cores arranged around the center axis at equal intervals.

3. An optical coupling structure comprising:
first and second optical connectors each of which is the optical connector according to claim 1, wherein the front end surface of the first optical connector and the front end surface of the second optical connector face each other at a distance in the second direction.

4. The optical connector according to claim 1, wherein the holding part is formed of quartz glass.

5. The optical connector according to claim 1, wherein the holding part is formed of metal.

6. The optical connector according to claim 1, wherein the holding part is formed of resin.

7. The optical connector according to claim 1, wherein the holding part has a plurality of V-grooves configured to accept the coating removed portions of the plurality of optical fibers respectively.

8. The optical connector according to claim 7, wherein each of the plurality of V-grooves extends along the second direction, and the plurality of V-grooves are sequentially provided in the first direction such that respective extending directions thereof are parallel to each other.

9. The optical connector according to claim 7, further comprising:
a lid placed on the plurality of V-grooves to cover the plurality of V-grooves.

10. The optical connector according to claim 7, wherein the V-grooves are configured to rotationally hold the coating removed portions of the plurality of optical fibers about the center axis.

11. The optical connector according to claim 1, wherein the holding part has a plurality of first holes configured to accept the coating removed portions of the plurality of optical fibers respectively.

12. The optical connector according to claim 11, wherein each of the plurality of first holes has an expanding portion in diameter toward an end closer to the fixing part in the second direction.

13. The optical connector according to claim 11, wherein the fixing part has one second hole communicating with the plurality of first holes or a plurality of second holes respectively communicating with the plurality of first holes.

14. The optical connector according to claim 11, wherein the first holes are configured to rotationally hold the coating removed portions of the plurality of optical fibers about the center axis.

15. The optical connector according to claim 1, wherein the fixing part has a fixing surface provided at a position lower than a height of the holding part.

16. The optical connector according to claim 1, wherein the optical-fiber holding component further comprises:
   a front surface extending along the first direction and a third direction intersecting with the first direction and the second direction;
   a bottom surface extending along the first direction and the second direction,
   wherein the holding part has a plurality of holding surfaces arranged in the first direction, each of the plurality of holding surfaces extending along the second direction, and the fixing part includes a fixing surface or a plurality of fixing surfaces,
   wherein the fixing surface or the plurality of fixing surfaces is continuously connected with the plurality of holding surfaces, and the fixing surface or the plurality of fixing surfaces is located closer to the bottom surface than a closest point of the plurality of holding surfaces to the bottom surface.

17. The optical connector according to claim 1, further comprising:
   a first adhesive provided on the resin coated portions placed on the fixing part, the first adhesive fixing the resin coated portions of the optical fibers to the fixing part of the optical-fiber holding component.

18. The optical connector according to claim 17, further comprising:
   a second adhesive provided on the coating removed portions held by the plurality of holding holes of the ferrule, the second adhesive fixing the coating removed portions of the optical fibers to the ferrule.

19. An optical connector comprising:
   a plurality of optical fibers each having a center axis, wherein the plurality of optical fibers include resin coated portions and coating removed portions being obtained by removing each resin coating by a predetermined length from a tip end of each of the optical fibers, and each of the optical fibers includes at least one core in a region shifted from a region on the center axis, the optical fibers being arranged in a first direction intersecting with the center axis;
   at least one optical-fiber holding component including a holding part defining a position of each of the coating removed portions in a plane perpendicular to the center axis and holding the coating removed portions; and a fixing part arranged side by side with the holding part in a second direction along the center axis and fixing the resin coated portions; and
   a ferrule housing the optical-fiber holding component and at least a part of each of the plurality of optical fibers therein,
   wherein the ferrule has:
      a front end surface intersecting with the second direction;
      an opening provided opposite to the front end surface and collectively accommodating the optical-fiber holding component and the plurality of optical fibers;
      an introduction hole extending from the opening along the second direction and holding the optical-fiber holding component; and
      a plurality of holding holes extending from a front end of the introduction hole opposite to the opening to the front end surface, and holding the coating removed portions of the plurality of optical fibers, respectively,
   wherein the at least one optical-fiber holding component includes a plurality of optical-fiber holding components, and
   wherein the opening correctively accommodates the plurality of optical-fiber holding components, the introduction hole collectively holds the plurality of optical-fiber holding components, and the respective optical-fiber holding components are stacked in a third direction intersecting with the first and second directions.

20. The optical connector according to claim 19, wherein each of the plurality of optical fibers has one core arranged on the center axis and a plurality of cores arranged around the center axis at equal intervals.

21. An optical coupling structure comprising:
   first and second optical connectors each of which is the optical connector according to claim 19, wherein the front end surface of the first optical connector and the front end surface of the second optical connector face each other at a distance in the second direction.

22. The optical connector according to claim 19, wherein the holding part is formed of quartz glass.

23. The optical connector according to claim 19, wherein the holding part is formed of metal.

24. The optical connector according to claim 19, wherein the holding part is formed of resin.

25. The optical connector according to claim 19, wherein the holding part has a plurality of V-grooves configured to accept the coating removed portions of the plurality of optical fibers respectively.

26. The optical connector according to claim 25, wherein the V-grooves are configured to rotationally hold the coating removed portions of the plurality of optical fibers about the center axis.

27. The optical connector according to claim 25, wherein each of the plurality of V-grooves extends along the second direction, and the plurality of V-grooves are sequentially provided in the first direction such that respective extending directions thereof are parallel to each other.

28. The optical connector according to claim 25, further comprising: a lid placed on the plurality of V-grooves to cover the plurality of V-grooves.

29. The optical connector according to claim 19, wherein the holding part has a plurality of first holes configured to accept the coating removed portions of the plurality of optical fibers respectively.

30. The optical connector according to claim 29, wherein each of the plurality of first holes has an expanding portion in diameter toward an end closer to the fixing part in the second direction.

31. The optical connector according to claim 29, wherein the fixing part has one second hole communicating with the plurality of first holes or a plurality of second holes respectively communicating with the plurality of first holes.

32. The optical connector according to claim 29, wherein the first holes are configured to rotationally hold the coating removed portions of the plurality of optical fibers about the center axis.

33. The optical connector according to claim 19, wherein the fixing part has a fixing surface provided at a position lower than a height of the holding part.

34. The optical connector according to claim 19, wherein the optical-fiber holding component further comprises:
- a front surface extending along the first direction and a third direction intersecting with the first direction and the second direction;
- a bottom surface extending along the first direction and the second direction,
- wherein the holding part has a plurality of holding surfaces arranged in the first direction, each of the plurality of holding surfaces extending along the second direction, and the fixing part includes a fixing surface or a plurality of fixing surfaces,
- wherein the fixing surface or the plurality of fixing surfaces is continuously connected with the plurality of holding surfaces, and the fixing surface or the plurality of fixing surfaces is located closer to the bottom surface than a closest point of the plurality of holding surfaces to the bottom surface.

35. The optical connector according to claim 19, further comprising:
- a first adhesive provided on the resin coated portions placed on the fixing part, the first adhesive fixing the resin coated portions of the optical fibers to the fixing part of the optical-fiber holding component.

36. The optical connector according to claim 35, further comprising: a second adhesive provided on the coating removed portions held by the plurality of holding holes of the ferrule, the second adhesive fixing the coating removed portions of the optical fibers to the ferrule.

* * * * *